(12) United States Patent
Taffer

(10) Patent No.: US 11,055,698 B2
(45) Date of Patent: Jul. 6, 2021

(54) MERCHANT LOCATION BASED DISPLAY FOR A PROJECTABLE TRANSACTION CARD

(71) Applicant: Capital One Services, LLC, McLean, VA (US)

(72) Inventor: Sam Taffer, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/512,106

(22) Filed: Jul. 15, 2019

(65) Prior Publication Data

US 2021/0019733 A1    Jan. 21, 2021

(51) Int. Cl.
| | | |
|---|---|---|
| *G06Q 20/34* | (2012.01) | |
| *G06K 19/077* | (2006.01) | |
| *H04W 4/021* | (2018.01) | |

(52) U.S. Cl.
CPC ..... *G06Q 20/351* (2013.01); *G06K 19/07707* (2013.01); *G06Q 20/352* (2013.01); *H04W 4/021* (2013.01)

(58) Field of Classification Search
CPC .. G06Q 20/3224; G06Q 20/40; G06Q 20/351; G06Q 20/352; G06K 19/07707; H04W 4/021
See application file for complete search history.

(56) References Cited

U.S. PATENT DOCUMENTS

| | | |
|---|---|---|
| 9,665,818 B1 | 5/2017 | Cardinal et al. |
| 9,691,066 B2 | 6/2017 | McGuinness et al. |
| 9,747,539 B1 | 8/2017 | Kendall et al. |
| 2007/0205290 A1 | 9/2007 | Newbrough et al. |
| 2009/0037326 A1 | 2/2009 | Chitti et al. |
| 2010/0312704 A1* | 12/2010 | Rohatgi ................. G06Q 20/40 705/44 |
| 2011/0153437 A1 | 6/2011 | Archer et al. |

(Continued)

FOREIGN PATENT DOCUMENTS

WO    2013131153 A1    9/2013

OTHER PUBLICATIONS

Hamburger, "Plastc wants to replace your entire wallet with a single card", The Verge, Oct. 7, 2014. (Year: 2014).*

(Continued)

*Primary Examiner* — Kito R Robinson
*Assistant Examiner* — Abdulmajeed Aziz
(74) *Attorney, Agent, or Firm* — Harrity & Harrity, LLP

(57) ABSTRACT

A device may determine information that identifies a location of a projectable transaction card that is capable of being used to conduct a transaction associated with a merchant. The device may determine that the location of the projectable transaction card matches a location associated with the merchant. The device may identify a virtual transaction number that is unique to the merchant, previously associated with the merchant, unique to an account associated with the projectable transaction card, and to be used in conducting the transaction. The device may provide the virtual transaction number for display on a display screen of the projectable transaction card. The virtual transaction number may not be displayed on the display screen of the projectable transaction card prior to a determination that the location of the projectable transaction card matches the location associated with the merchant.

20 Claims, 8 Drawing Sheets

(56) References Cited

U.S. PATENT DOCUMENTS

| | | | | |
|---|---|---|---|---|
| 2014/0114780 A1* | 4/2014 | Menefee | ............... | G06Q 20/327 705/21 |
| 2014/0249904 A1* | 9/2014 | Nelsen | ................... | G06Q 20/10 705/14.23 |
| 2014/0337957 A1* | 11/2014 | Feekes | ................ | H04L 63/0861 726/9 |
| 2016/0027000 A1* | 1/2016 | Kurian | ................. | G06Q 20/363 705/41 |
| 2016/0027005 A1* | 1/2016 | Kurian | .................... | G07F 19/20 235/379 |
| 2016/0189148 A1* | 6/2016 | Fung | .................. | G06Q 20/3829 705/71 |
| 2016/0217455 A1* | 7/2016 | Hosny | .............. | G06K 19/06187 |
| 2016/0259929 A1 | 9/2016 | Cash | | |
| 2018/0268405 A1* | 9/2018 | Lopez | ................... | G06Q 20/204 |

OTHER PUBLICATIONS

Radhika Seth, "All-In-One Credit Card", https://www.yankodesign.com/2009/10/22/all-in-one-credit-card/, Oct. 22, 2019, 9 pages.

Jon Brodkin, "A MasterCard with an LCD display and touch-sensitive buttons", https://arstechnica.com/gadgets/2012/11/a-mastercard-with-an-lcd-display-and-touch-sensitive-buttons/, Nov. 8, 2012, 3 pages.

Royole, "Royole Mass Production Launch Ceremony for Royole's Fully Flexible Display Campus", http://www.royole.com/us/flexible-display, Dec. 16, 2015, 10 pages.

Laura He, "Ultra-thin flexible display maker Royole raises another US$800m", https://www.scmp.com/business/companies/article/2113079/ultra-thin-flexible-display-maker-royole-raises-another-us800m, Sep. 27, 2017, 4 pages.

\* cited by examiner

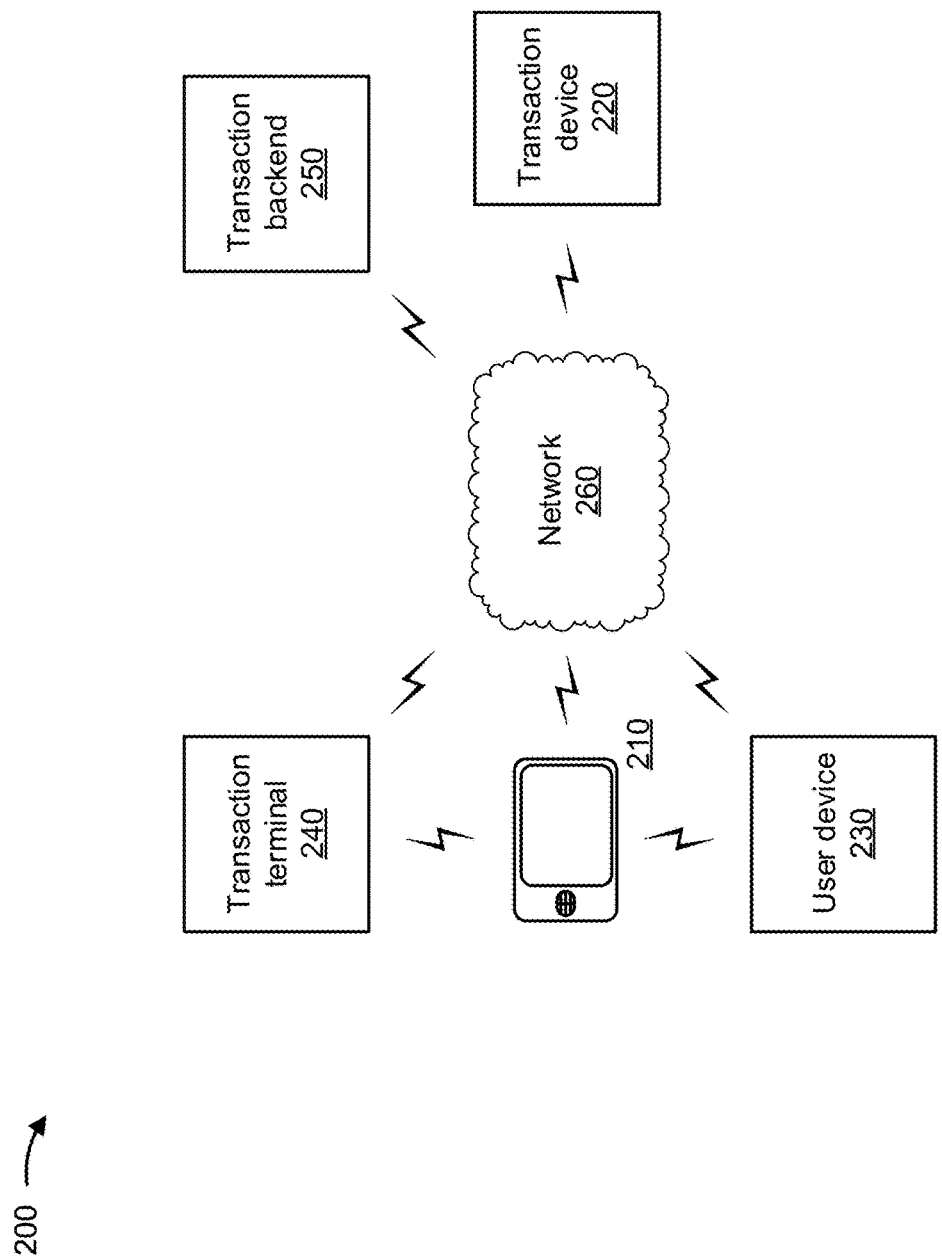

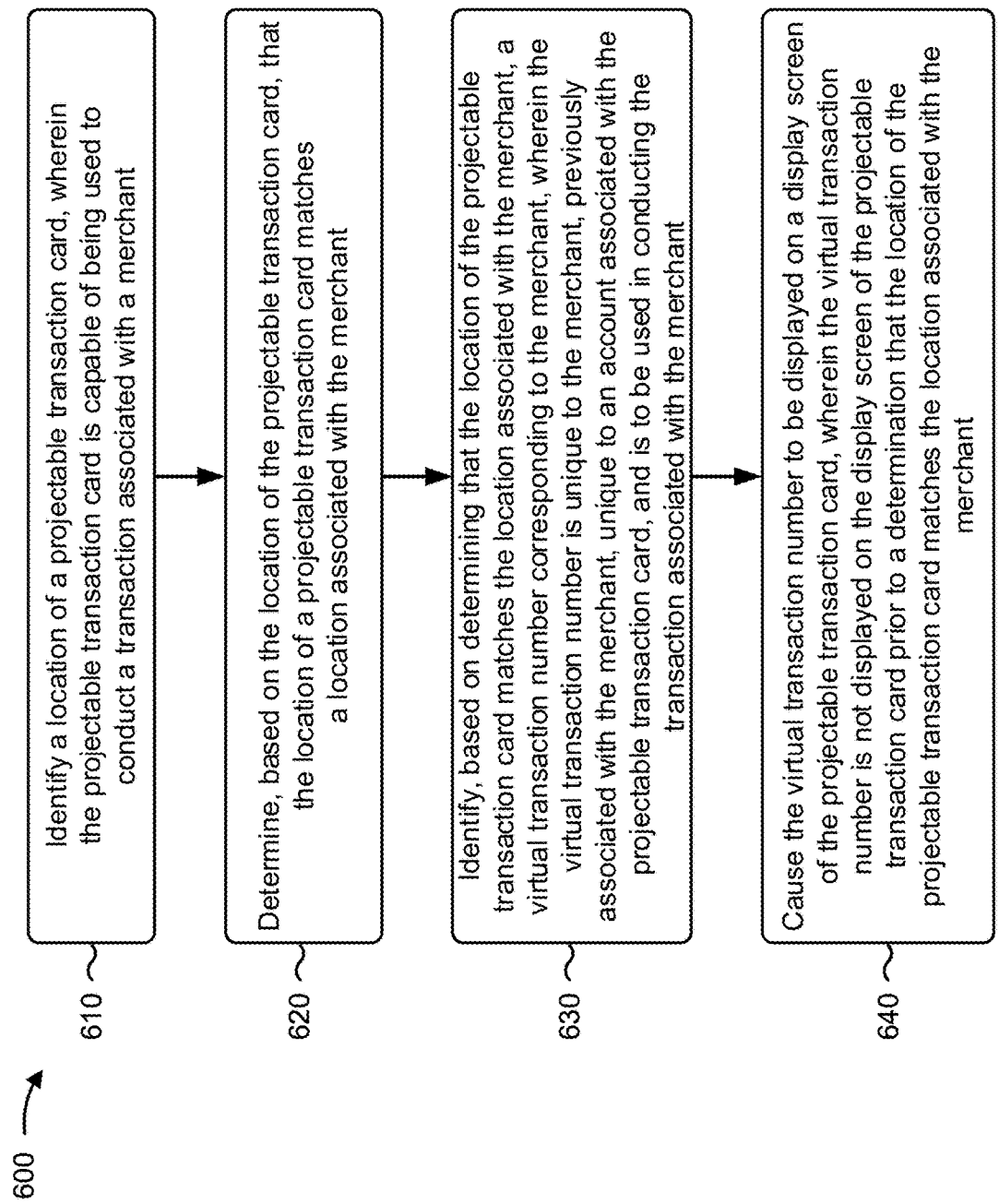

MERCHANT LOCATION BASED DISPLAY FOR A PROJECTABLE TRANSACTION CARD

BACKGROUND

A virtual transaction number is a transaction number, associated with a user account, that allows a transaction to be performed without using a primary or permanent transaction number associated with the user account. For example, the virtual transaction number can be a virtual credit card number that can be used to conduct transactions associated with a user account (rather than using, and therefore exposing, an actual credit card number associated with the user account). In some cases, the virtual transaction number may be associated with a particular merchant (e.g., such that transactions associated only with the particular merchant use the virtual transaction number).

SUMMARY

According to some implementations, a method may include determining, by a device, information that identifies a location of a projectable transaction card, wherein the projectable transaction card is capable of being used to conduct a transaction associated with a merchant; determining, by the device, that the location of the projectable transaction card matches a location associated with the merchant; identifying, by the device and based on determining that the location of the projectable transaction card matches the location associated with the merchant, a virtual transaction number, wherein the virtual transaction number is: unique to the merchant, previously associated with the merchant, unique to an account associated with the projectable transaction card, and is to be used in conducting the transaction associated with the merchant; and providing, by the device, the virtual transaction number for display on a display screen of the projectable transaction card, wherein the virtual transaction number is not displayed on the display screen of the projectable transaction card prior to a determination that the location of the projectable transaction card matches the location associated with the merchant.

According to some implementations, a device may include one or more memories; and one or more processors, communicatively coupled to the one or more memories, configured to: determine that a projectable transaction card is at a location associated with a merchant, wherein the projectable transaction card is capable of being used to conduct a transaction associated with the merchant; identify, based on determining that the projectable transaction card is at the location associated with the merchant, a virtual transaction number corresponding to the merchant, wherein the virtual transaction number is: unique to the merchant, previously associated with the merchant, unique to an account associated with the projectable transaction card, and is to be used in conducting the transaction associated with the merchant; and provide the virtual transaction number for display on a display screen of the projectable transaction card, wherein the virtual transaction number is not displayed on the display screen of the projectable transaction card prior to a determination that the location of the projectable transaction card is at the location associated with the merchant.

According to some implementations, a non-transitory computer-readable medium may store one or more instructions. The one or more instructions, when executed by one or more processors of a device, may cause the one or more processors to: identify a location of a projectable transaction card, wherein the projectable transaction card is capable of being used to conduct a transaction associated with a merchant; determine, based on the location of the projectable transaction card, that the location of the projectable transaction card matches a location associated with the merchant; identify, based on determining that the location of the projectable transaction card matches the location associated with the merchant, a virtual transaction number corresponding to the merchant, wherein the virtual transaction number is: unique to the merchant, previously associated with the merchant, unique to an account associated with the projectable transaction card, and is to be used in conducting the transaction associated with the merchant; and cause the virtual transaction number to be displayed on a display screen of the projectable transaction card, wherein the virtual transaction number is not displayed on the display screen of the projectable transaction card prior to a determination that the location of the projectable transaction card matches the location associated with the merchant.

BRIEF DESCRIPTION OF THE DRAWINGS

FIG. 2 is a diagram of an example environment in which systems and/or methods described herein may be implemented.

FIGS. 4-6 are flow charts of example processes associated with a merchant location based display for a projectable transaction card.

DETAILED DESCRIPTION

Figure 1A:
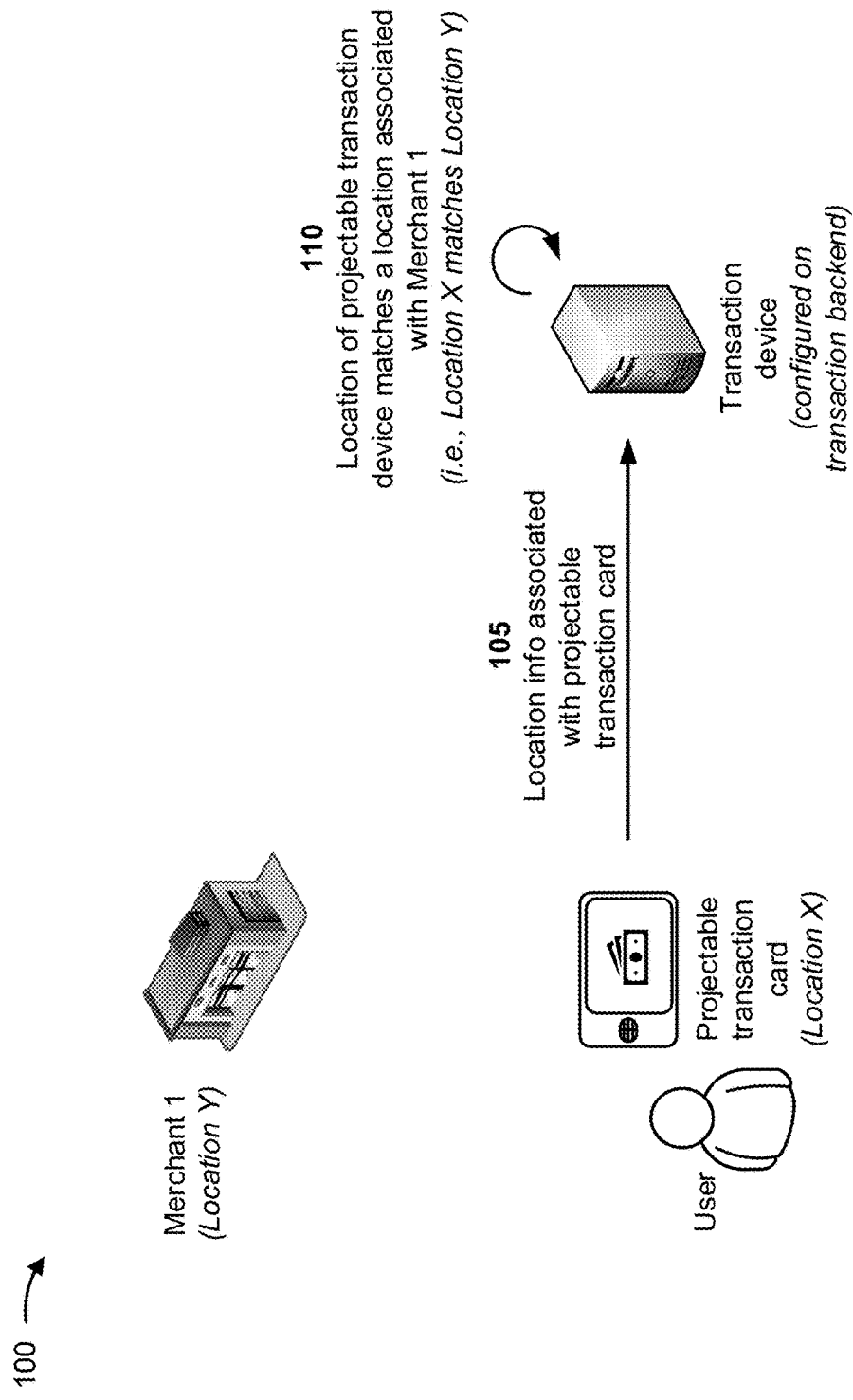
FIGS. 1A-1C are diagrams of an example implementation described herein.

The following detailed description of example implementations refers to the accompanying drawings. The same reference numbers in different drawings may identify the same or similar elements.

As described above, a virtual transaction number can be associated with a particular merchant. In some cases, multiple virtual transaction numbers may be associated with a particular user account, and each virtual transaction number may be associated with a different merchant. Thus, it is possible that a given user account may be associated with multiple virtual transaction numbers, where each virtual transaction number is associated with a different merchant.

In some cases, a transaction that uses a virtual transaction number can be performed using a projectable transaction card. A projectable transaction card is a device, capable of being used to conduct a transaction, that includes a display (e.g., a display screen) that can be used to display information (e.g., to a user). Typically, information provided for display via the display of the projectable transaction card is dynamic and, therefore, can be modified, updated, customized, or the like. For example, when used in conjunction with a virtual transaction number, a display of a projectable transaction card can be updated to display the virtual transaction number, a name of an account holder associated with the virtual transaction number, an image associated with the virtual transaction number, and/or the like.

In a scenario in which there are multiple virtual transaction numbers associated with a user account, identification of the appropriate virtual transaction number to use for a given transaction is needed. Thus, when using a projectable transaction card, the user of the projectable transaction card may need to manually identify (e.g., via user input to a user interface of the projectable transaction card or a user interface of a user device capable of communicating with the projectable transaction card) an appropriate virtual transaction number to be used for a given transaction. For example, as described above, a user account may be associated with multiple virtual transaction numbers, each associated with a different merchant. Here, when conducting a transaction, associated with a particular merchant, a user may need to identify a particular virtual transaction number, of the multiple virtual transaction numbers, that is associated with the particular merchant (e.g., to ensure that the particular virtual transaction number is used when performing the transaction using the projectable transaction card). Generally, upon identification of the particular virtual transaction number, the projectable transaction card can be updated to display information associated with the selected virtual transaction number.

However, reliance on user identification of a virtual transaction number to be used for a given transaction card can result in a transaction failure (e.g., when a virtual transaction number identified by the user is not authorized to be used for transactions associated with the particular merchant), an improper transaction (e.g., when the virtual transaction number identified by the user is not one associated with the merchant, but can still be used to perform the transaction), and/or the like. These issues can result in delay in performing a transaction (e.g., when a different virtual transaction number needs to be subsequently identified), transactions being improperly attributed to a given merchant (e.g., when the identified virtual transaction number is not associated with the merchant but is used to perform the transaction), as well as wasted processing and network resources (e.g., resulting from attempting to perform failed transactions and/or performing improper transactions), thereby reducing overall utility and efficacy when using virtual transaction numbers.

Further, reliance on user identification of a virtual transaction number to be displayed on the projectable transaction card may result in an improper virtual transaction number being displayed, which is not only wasteful of projectable transaction card power resources, but may also compromise security of the improperly identified virtual transaction number. Moreover, reliance on user identification of the virtual transaction number may introduce delay in performing a transaction (e.g., since a user may need to navigate one or more user interfaces in association with identifying the virtual transaction number).

Some implementations described herein provide techniques and apparatuses associated with a merchant location based display for a projectable transaction card. In some implementations, a device (e.g., a transaction device, a projectable transaction card, a user device, and/or the like) may determine that a location of a projectable transaction card matches a location associated with a merchant. Here, the device may identify a virtual transaction number, associated with the merchant, based on determining that the location of the projectable transaction card matches the location associated with the merchant, and may provide information associated with the identified virtual transaction number for display on a display screen of the projectable transaction card. Additional details are described below.

In some implementations, the merchant location based techniques described herein eliminate reliance on user identification of a virtual transaction number, thereby reducing or eliminating transaction failures and/or improper transactions attributable to user misidentification of a virtual transaction number. Further, the merchant location based techniques described herein ensure that information associated with an appropriate virtual transaction number, for a given transaction at a merchant location, is displayed on a projectable transaction card, thereby conserving power resources of the projectable transaction card (e.g., since the information associated with the virtual transaction number may be automatically displayed, without a need for a user to navigate one or more user interfaces via the projectable transaction card). Moreover, the merchant location based techniques described herein improve security associated with using a projectable transaction card by, for example, ensuring that information associated with an appropriate virtual transaction number is displayed at a given time and, in some cases, removing the information associated with the virtual transaction number from the display (e.g., after the transaction at the merchant location is complete).

Figure 1B:
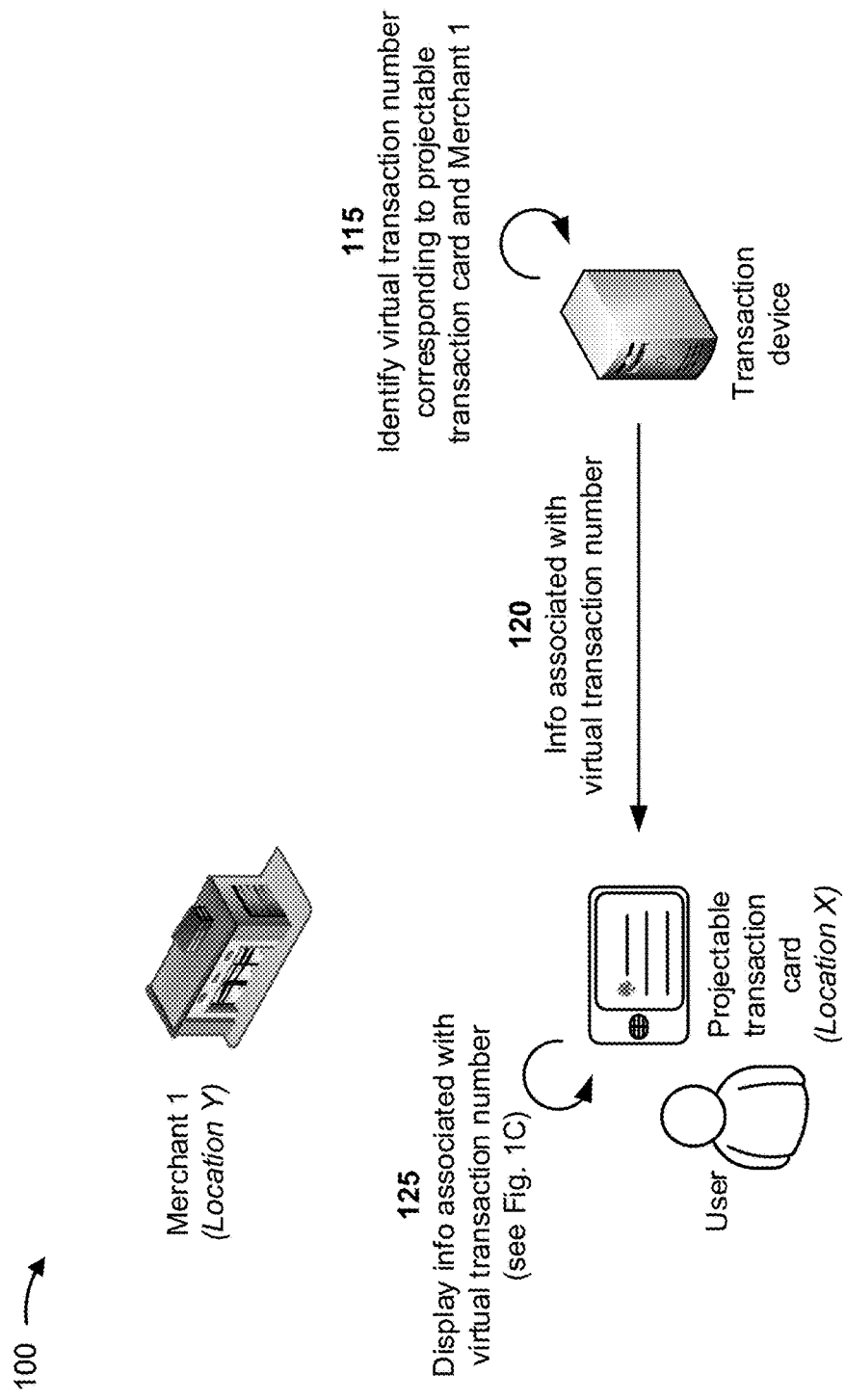
Figure 1C:
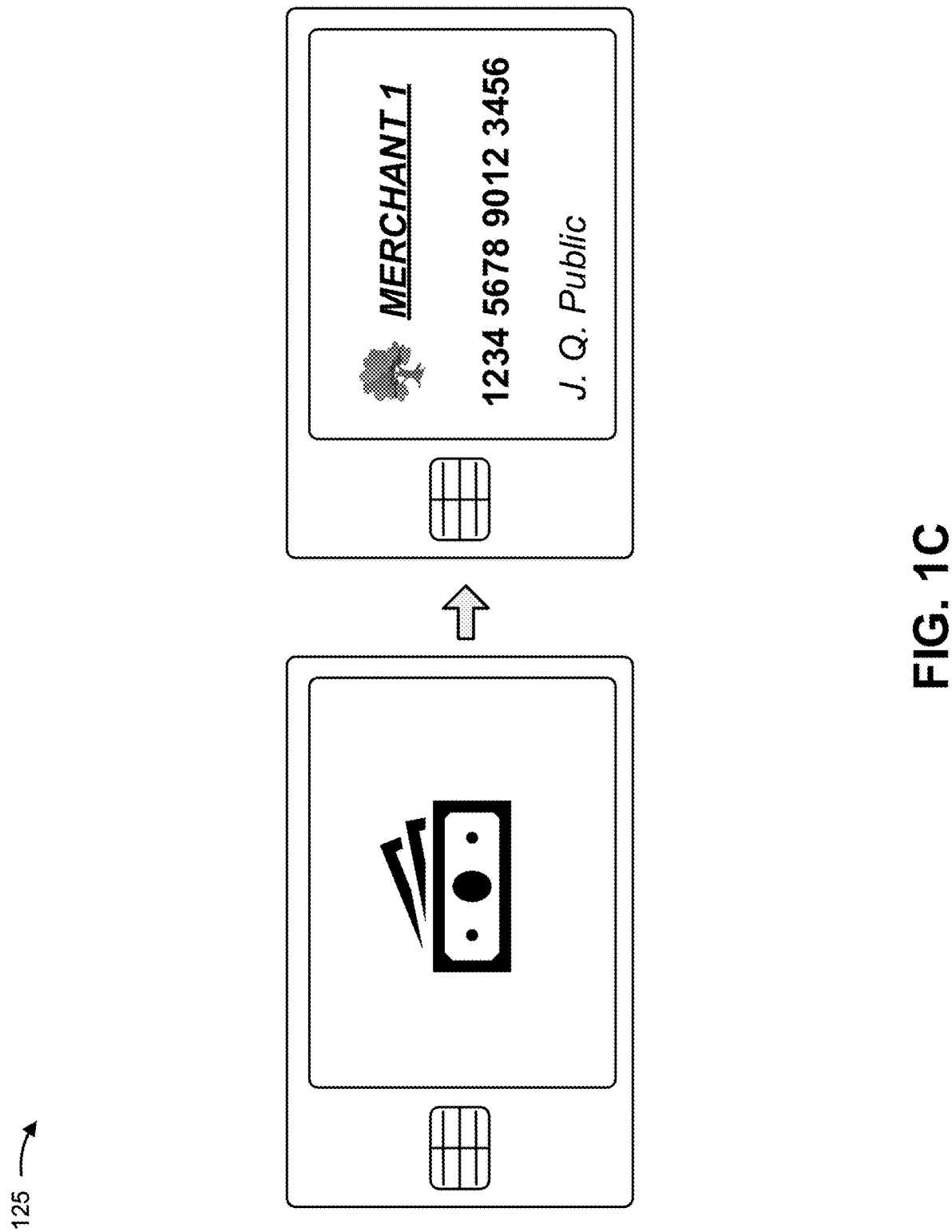

FIGS. 1A-1C are diagrams of an example implementation 100 described herein. In example implementation 100, a user is associated with a projectable transaction card that is capable of being used to conduct transactions associated with merchants. As indicated in FIG. 1A, the projectable transaction card may be capable of communicating (e.g., via a user device, via a wireless network, and/or the like) with a transaction device. The transaction device may include one or more devices associated with performing a transaction using the projectable transaction card. For example, as indicated in FIG. 1A, the transaction device may be configured on a transaction backend associated with performing transactions using projectable transaction cards. In some implementations, the transaction device may be at least partially configured on a projectable transaction card, a user device, and/or the transaction backend, as described below.

As shown by reference number 105, in some implementations, the transaction device may determine information that identifies a location of the projectable transaction card. The information that identifies the location of the projectable transaction card may include, for example, a set of global positioning system (GPS) coordinates, a latitude and longitude, a street address, an indication that the projectable transaction card is at or near a transaction terminal associated with a merchant, an indication that the projectable transaction card is at or near a beacon device located at a merchant location, and/or another type of information that identifies or can be used to identify the location of the projectable transaction card.

In some implementations, the information that identifies the location of the projectable transaction card may be determined by the projectable transaction card. For example, the projectable transaction card may be capable of determining information (e.g., a set of GPS coordinates) that identifies the location of the projectable transaction card, and may provide the information that identifies the location of the projectable transaction card to the transaction device. In some implementations, the projectable transaction card may provide the information that identifies the location of the projectable transaction card via a wireless network (e.g., when the transaction device is configured on a transaction backend and the projectable transaction card is capable of communicating via a cellular network). Additionally, or alternatively, the projectable transaction card may provide the information that identifies the location of the projectable transaction card via a user device. For example, the projectable transaction card may be paired with the user device (e.g., via Bluetooth or another near field communication technology), and may provide the information that identifies the location of the projectable transaction card to the user device, which may then provide the information that identifies the location of the projectable transaction card to the transaction device (e.g., via a cellular network).

Additionally, or alternatively, the information that identifies the location of the projectable transaction card may be determined by a user device associated with the projectable transaction card. For example, the projectable transaction card may be paired with the user device (e.g., via Bluetooth or another near field communication technology). Here, when connected to the projectable transaction card, the user device may be near the projectable transaction card such that a location of the user device is representative of the location of the projectable transaction card. In this example, the user device may be capable of determining information (e.g., a set of GPS coordinates) that identifies a location of the user device, and may provide the information that identifies the location of the user device, and therefore the location of the projectable transaction card, to the transaction device.

In some implementations, the information that identifies the location of the projectable transaction card may be in the form of an indication associated with a merchant device, such as a transaction terminal or a beacon device. For example, the projectable transaction card and/or the user device may communicate (e.g., using a near field communication technology) with a transaction terminal associated with the merchant (e.g., a device at the merchant location via which transactions are performed). Here, upon such communication, the projectable transaction card, the user device, and/or the transaction terminal may provide, to the transaction device, information indicating that the projectable transaction card is at or near the transaction terminal. The indication may include information that identifies the transaction terminal, such as a device identifier, a network address, a merchant identifier, and/or the like. In this example, the indication that the projectable transaction card is at or near the transaction terminal may, in addition to identifying the location of the projectable transaction card, operate as an indication that the location of the projectable transaction card matches a location associated with the merchant (as described below in association with reference number 110).

As another example, the projectable transaction card and/or the user device may receive a signal transmitted by a beacon device associated with the merchant (e.g., a device, located in or near a merchant store, that is configured to (periodically) transmit a beacon for reception by projectable transaction cards and/or user devices). Here, upon receiving the beacon, the projectable transaction card and/or the user device may provide, to the transaction device, an indication that the projectable transaction card has received the beacon. The indication may include information associated with the beacon device, such as a device identifier, a network address, a merchant identifier, and/or the like. In this example, the indication that the projectable transaction card has received the beacon may, in addition to identifying the location of the projectable transaction card, operate as an indication that the location of the projectable transaction card matches the location associated with the merchant (as described below in association with reference number 110).

As further shown in FIG. 1A, and by reference number 110, the transaction device may determine that the location of the projectable transaction card matches a location associated with a merchant. For example, as indicated in FIG. 1A, the projectable transaction card (e.g., when being carried by the user) may be at location X, and the transaction device may receive (e.g., from the projectable transaction card or from the user device paired with the projectable transaction card) information that identifies the location of the projectable transaction card (e.g., a set of GPS coordinates corresponding to location X). In this example, the transaction device has access to information that identifies a location associated with a merchant (e.g., location Y associated with merchant 1), and the transaction device may determine whether the location of the projectable transaction card matches the location associated with the merchant (e.g., whether location X matches location Y).

In some implementations, the information that identifies the location associated with the merchant may include, for example, a set of GPS coordinates, a latitude and longitude, a street address, information that describes a particular geographic area, and/or the like, that is associated with the merchant. As a particular example, the identified location may correspond to a location at or near which a brick and mortar store, associated with the merchant, is located. In some implementations, the transaction device may have access to a data structure that associates a given merchant with one or more locations. For example, the transaction device may have access to a data structure that associates a first merchant with a first set of locations (e.g., one or more sets of GPS coordinates, each associated with a different location) and associates a second merchant with a second set of locations. In such a case, the transaction device may compare the location of the projectable transaction card to one or more of the first set of locations and one or more of the second set of locations (e.g., until the transaction device either identifies a merchant location that matches the location of the projectable transaction card, or determines that the none of the first or second sets of locations matches that of the projectable transaction card).

In some implementations, the transaction device may compare the information that identifies the location of the projectable transaction card and the information that identifies the location associated with the merchant and, based on the comparison, may determine that the location of the projectable transaction card matches the location associated with the merchant. For example, in the context of example implementation 100, the transaction device may compare GPS coordinates that identify location X and GPS coordinates that identify location Y in order to determine whether location X matches location Y (i.e., whether the projectable transaction card is at or near a store associated with the merchant).

In some implementations, the transaction device may determine that the location of the projectable transaction card matches the location associated with the merchant based on determining that the location of the projectable transaction card is within a threshold distance of the location associated with the merchant. For example, the information that identifies the location of the projectable transaction card may be a first set of GPS coordinates, and the transaction device may have access to a second set of GPS coordinates that identifies the location associated with the merchant. Here, the transaction device may determine whether a distance between the location identified by the first set of GPS coordinates and the location identified by the second set of GPS coordinates satisfies a distance threshold (e.g., is less than or equal to one mile, 500 yards, 300 feet, and/or the like), and may determine whether the location of the projectable transaction card matches the location associated with the merchant, accordingly.

In some implementations, the transaction device may determine that the location of the projectable transaction card matches the location associated with the merchant based on determining that the location of the projectable transaction card is within a location, associated with the merchant, that is defined by a geographical area. For example, the information that identifies the location of the projectable transaction card may be a first set of GPS coordinates, and the transaction device may have access to multiple sets of GPS coordinates that, collectively, define a geographical area associated with the merchant (e.g., a circular area, a rectangular area, an irregular shaped area, and/or the like). Here, the transaction device may determine whether the location identified by the first set of GPS coordinates is within the geographical area, and may determine whether the location of the projectable transaction card matches the location associated with the merchant, accordingly.

In some implementations, the transaction device may determine that the location of the projectable transaction card matches the location associated with the merchant based on an indication that the projectable transaction card is at or near a transaction terminal associated with the merchant. For example, the transaction device may receive, from the projectable transaction card and/or the user device, an indication that the projectable transaction card is at or near a transaction terminal, as described above. Here, the transaction device may determine (e.g., based on information, accessible by the transaction device, that associates transaction terminals and merchants) that the transaction terminal is associated with the merchant, and may determine that the location of the projectable transaction card matches the location associated with the merchant based on determining that the transaction terminal is associated with the merchant.

In some implementations, the transaction device may determine that the location of the projectable transaction card matches the location associated with the merchant based on an indication that the projectable transaction card is at or near a beacon device associated with the merchant. For example, the transaction device may receive, form the projectable transaction card and/or the user device, an indication that the projectable transaction card and/or the user device received a beacon transmitted by a beacon device, as described above. Here, the transaction device may determine (e.g., based on information, accessible by the transaction device, that associates beacon devices and merchants) that the beacon device is associated with the merchant, and may determine that the location of the projectable transaction card matches the location associated with the merchant based on determining that the beacon device is associated with the merchant.

Next, as shown in FIG. 1B and by reference number 115, the transaction device may identify a virtual transaction number based on determining that the location of the projectable transaction card matches the location associated with the merchant (i.e., that the projectable transaction card is at the location associated with the merchant). The virtual transaction number may be a virtual transaction number that is to be used for conducting a transaction associated with the merchant. In other words, the virtual transaction number may be a virtual transaction number associated with the merchant (e.g., a virtual transaction number authorized for use in a transaction associated with the merchant). In some implementations, the transaction device may identify the virtual transaction number based on information that identifies the merchant. For example, the transaction device may identify the merchant associated with the location that matches that of the projectable transaction card, and may identify the virtual transaction number as a virtual transaction number associated with the identified merchant. In this way, the virtual transaction number is identified based on information that identifies the merchant, rather than based on information that identifies the location of the projectable transaction card. In some implementations, the virtual transaction number may be unique to the merchant.

In other words, in some implementations, the virtual transaction number may be associated with only the merchant (e.g., rather than being associated with multiple merchants). In some implementations, the virtual transaction number may be previously associated with the merchant. In other words, in some implementations, an association between the virtual transaction number and the merchant may be established prior to the identification of the virtual transaction number. In some implementations, the virtual transaction number may be previously associated with the merchant based on a prior interaction (e.g., a prior use of the virtual transaction number for a transaction associated with the merchant). Additionally, or alternatively, the virtual transaction number may be previously associated with the merchant based on a request (e.g., provided by the projectable transaction card and/or the user device) to associate the virtual transaction number with the merchant. In some implementations, the virtual transaction number may be one of plurality of virtual transaction numbers associated with the account, where each virtual transaction number corresponds to a respective one of a plurality of merchants. In some implementations, the virtual transaction number may be unique to an account associated with the projectable transaction card. In other words, in some implementations, the virtual transaction number may be associated with only the account (e.g., the user account) tied to the projectable transaction card.

In some implementations, the transaction device may identify the virtual transaction number based on causing the virtual transaction number to be generated. For example, the transaction device may determine that the location of the projectable transaction card matches the location associated with the merchant, and may cause the virtual transaction number to be generated based at least in part on this determination (e.g., when no virtual transaction number associated with the merchant exists). Here, the generated virtual transaction number may be associated with the merchant, and the transaction device, based on causing the virtual transaction number to be generated, may identify the virtual transaction number as the virtual transaction number corresponding to the merchant. In some implementations, the transaction device, the projectable transaction card, and/or the user device may generate the virtual transaction number or cause the virtual transaction number to be generated.

As shown by reference number 120, the transaction device may provide information associated with the virtual transaction number for display on a display screen of the projectable transaction card. For example, the transaction device may provide information associated with the virtual transaction number, such as the virtual transaction number, information that identifies a name on an account associated with the virtual transaction number (e.g., a name of the user), an image associated with the merchant corresponding to the virtual transaction number, and/or the like, for display on the display screen of the projectable transaction card.

In some implementations, the transaction device may provide the information associated with the virtual transaction number for display based on an indication that the virtual transaction number is to be used at the location associated with the merchant. For example, after identifying the virtual transaction number, the transaction device may provide, for display via the display screen of the projectable transaction card, a user interface associated with whether to use the virtual transaction number (e.g., a user interface requesting that the user confirm that the virtual transaction number should be used at the merchant location). Here, the transaction device may receive, based on user input provided via the user interface, an indication that the virtual transaction number is to be used at the location associated with the merchant (e.g., when the user confirms that the virtual transaction number is to be used at the location associated with the merchant), and the transaction device may provide the information associated with the virtual transaction number for display on the display screen of the projectable transaction card based on receiving the indication.

In some implementations, the transaction device may provide the information associated with the virtual transaction number for display based on determining that a number of transactions satisfies a transaction threshold. For example, the transaction device may identify (e.g., based on transaction information accessible by the transaction device) a number of transactions, associated with the virtual transaction number, corresponding to the location associated with the merchant (i.e., the transaction device may identify a number of transactions performed at the location using the virtual transaction number). Here, the transaction device may determine whether the number of transactions satisfies a transaction threshold (e.g., that a threshold number of transactions have been performed at the location using the identified virtual transaction number), and may automatically (e.g., without user intervention) provide the information associated with the virtual transaction number for display on the display screen of the projectable transaction card.

As shown by reference number 125, the projectable transaction card may display the information associated with the virtual transaction number via the display screen of the projectable transaction card. FIG. 1C illustrates an example display of information associated with the virtual transaction number. In the example shown in FIG. 1C, the display screen of the projectable transaction card is updated such that, rather than displaying a default image (as illustrated in the left portion of FIG. 1C), the display screen displays the virtual transaction number (1234 5678 9012 3456), a name associated with an account of the virtual transaction number (J. Q. Public), information that identifies the merchant (Merchant 1), and an image associated with the merchant (as illustrated in the right portion of FIG. 1C).

Notably, the virtual transaction number is not displayed on the display screen of the projectable transaction card prior to the determination that the location of the projectable transaction card matches the location associated with the merchant (i.e., before the projectable transaction card is at the location associated with the merchant). For example, as illustrated in FIG. 1C, the display screen of the projectable transaction card may display the default image until after the virtual transaction number is identified.

In some implementations, after the information associated with the virtual transaction number is provided for display, the projectable transaction card may be used to perform the transaction associated with the merchant (using the virtual transaction number). For example, an applet may be configured on the projectable transaction card to communicate the virtual transaction number via an on-board chip used in association with conducting the transaction.

In some implementations, the transaction device may determine that the transaction associated with the merchant has been completed, and may cause the information associated with the virtual transaction number to stop being displayed on the display screen of the projectable transaction card. For example, the transaction device may determine that the transaction has been completed and may provide, to the projectable transaction card and/or the user device paired with the projectable transaction card, an indication to stop displaying the information associated with the virtual transaction number. Here, upon receiving the indication, the projectable transaction card and/or the user device may cause the information associated with the virtual transaction number to stop being displayed (e.g., such that the default image is displayed, such that an indication that the transaction is complete is displayed, and/or the like). In some implementations, the information associated with the virtual transaction number may be displayed only when the projectable transaction card is paired with the user device (e.g., via Bluetooth or some other near field communication technology). In other words, in a case where the projectable transaction card is paired with the user device, the projectable transaction card may be configured to display the information associated with the virtual transaction number only while the projectable transaction card is paired with the user device.

In some implementations, the transaction device may cause the virtual transaction number to stop being displayed based on determining that an updated location of the projectable transaction card does not match the location associated with the merchant (e.g., regardless of whether a transaction has been completed). For example, the transaction device may (e.g., after a configured period of time) determine information that identifies an updated location of the projectable transaction card (e.g., in a manner similar to that described above). Here, the transaction device may determine whether the updated location of the projectable transaction card matches the location associated with the merchant (e.g., whether the projectable transaction card is still at or near the location associated with the merchant). In this example, if the transaction device determines that the updated location does not match the location associated with the merchant, then the transaction device may cause the information associated with the virtual transaction number to stop being displayed on the display screen of the projectable transaction card. Conversely, if the transaction device determines that the updated location matches the location associated with the merchant, then the transaction device may not cause the information associated with the virtual transaction number to stop being displayed on the display screen of the projectable transaction card.

By automatically identifying the virtual transaction number in the manner described above, reliance on user identification of a virtual transaction number is eliminated, thereby reducing or eliminating transaction failures and/or improper transactions attributable to user misidentification of a virtual transaction number. Further, the techniques described above ensure that information associated with an appropriate virtual transaction number, for a given transaction at a merchant location, is displayed on a projectable transaction card, which conserves power resources of the projectable transaction card (e.g., since the information associated with the virtual transaction number may be automatically displayed, without a need for a user to navigate one or more user interfaces via the projectable transaction card). Further, security associated with using a projectable transaction card is improved by, for example, ensuring that information associated with an appropriate virtual transaction number is displayed at a given time.

As indicated above, FIGS. 1A-1C are provided as one or more examples. Other examples may differ from what is described with regard to FIGS. 1A-1C. For example, while example implementation 100 is described in the context of the transaction device being configured on the transaction backend, other implementations are possible. For example, the transaction device may be at least partially configured on the projectable transaction card, the user device associated with the projectable transaction card, a transaction terminal, the transaction backend, and/or another device associated with performing a transaction. In other words, any portion of the above described functionality of the transaction device may be partially or wholly configured on any one or more of the projectable transaction card, the user device, the transaction terminal, and/or the transaction backend.

As a particular example, in some implementations, the projectable transaction card itself may be configured to, based on a determination that a location of the projectable transaction card matches a location associated with a merchant, identify a virtual transaction number that is to be displayed. In other words, the transaction device functionality associated with identifying the virtual transaction number may be configured on the projectable transaction card. In such a case, the projectable transaction card may pair with a user device to update a cache of stored virtual transaction numbers and merchant relationships that the user device receives from the transaction backend (e.g., such that the projectable transaction card does not need to receive the information associated with the virtual transaction number from another device in order to display such information).

FIG. 2 is a diagram of an example environment 200 in which systems and/or methods described herein may be implemented. As shown in FIG. 2, environment 200 may include a projectable transaction card 210, a transaction device 220, a user device 230, a transaction terminal 240, a transaction backend 250, and a network 260. Devices of environment 200 may interconnect via wired connections, wireless connections, or a combination of wired and wireless connections.

Projectable transaction card 210 includes a transaction card capable of displaying information associated with a virtual transaction number, as described herein. In some implementations, projectable transaction card 210 is capable of communicating with one or more other devices of environment 200 (e.g., via Bluetooth communication, communication, Wi-Fi communication, a near field communication session, via a cellular network, and/or the like). Projectable transaction card 210 is capable of communicating data for a transaction (e.g., with transaction terminal 240). For example, projectable transaction card 210 may communicate data including a virtual transaction number, transaction card identification information (e.g., an account identifier, a cardholder identifier, and/or the like), account information, banking information, and/or the like, associated with performing a transaction. For example, to communicate the data, projectable transaction card 210 may include a magnetic strip and/or an integrated circuit (IC) chip (e.g., a EUROPAY®, MASTERCARD®, VISA® (EMV) chip). In some implementations, projectable transaction card 210 may include an antenna to communicate data associated with projectable transaction card 210. The antenna may be a passive RF antenna, an active RF antenna, and/or a battery-assisted RF antenna.

Transaction device 220 includes a device capable of performing one or more operations associated with merchant location based display for a projectable transaction card, as described herein. For example, transaction device 220 may include a server or group of servers (e.g., configured on transaction backend 250). In some implementations, transaction device 220 may be at least partially configured on projectable transaction card 210 and/or user device 230 (e.g., such that projectable transaction card 210 and/or user device 230 can perform one or more operations associated with merchant location based display for projectable transaction card 210), as described above.

User device 230 includes a user device capable of receiving, generating, determining, processing, and/or providing information associated with one or more operations associated with merchant location based display for a projectable transaction card, as described herein. For example, user device 230 may include a mobile phone (e.g., a smart phone, a radiotelephone, etc.), a computer (e.g., a desktop computer, a laptop computer, a tablet computer, a handheld computer, a server device, etc.), an internet of things (IoT) device, or a similar device. In some implementations, user device 230 may be capable of pairing with projectable transaction card 210 using, for example, Bluetooth technology or another near field communication technology.

Transaction terminal 240 includes one or more devices capable of receiving, generating, storing, processing, and/or providing information associated with facilitating a transaction (a point-of-sale (PoS) transaction). For example, transaction terminal 240 may include a communication device and/or computing device capable of receiving data from projectable transaction card 210 and processing a transaction based on the data. For example, transaction terminal 240 may include a PoS terminal, a security access terminal, an ATM terminal, and/or the like. In some implementations, transaction terminal 240 may be owned and/or operated by one or more individuals or businesses engaged in a sale of goods or services (e.g., one or more merchants, vendors, service providers, and/or the like). Transaction terminal 240 may include one or more input devices and/or output devices to facilitate obtaining transaction card data from projectable transaction card 210 and/or from an interaction or authorization from a cardholder of projectable transaction card 210. Example input devices of transaction terminal 240 may include a number keypad, a touchscreen, a magnetic strip reader, a chip reader, and/or an RF signal reader. A magnetic strip reader of transaction terminal 240 may receive transaction card data as a magnetic strip of projectable transaction card 210 is swiped along the magnetic strip reader. A chip reader of transaction terminal 240 may receive transaction card data from an IC chip (e.g., an EMV chip) of projectable transaction card 210 when the chip is communicatively coupled with the chip reader. An RF signal reader of transaction terminal 240 may enable contactless transactions from projectable transaction card 210 by obtaining transaction card data wirelessly from projectable transaction card 210 as projectable transaction card 210 comes within a range of transaction terminal 240 in which the RF signal reader may detect an RF signal from an RF antenna of projectable transaction card 210. Example output devices of transaction terminal 240 may include a display device, a speaker, a printer, and/or the like.

Transaction backend 250 includes one or more devices capable of authorizing and/or facilitating a transaction. For example, transaction backend 250 may include one or more servers and/or computers to store and/or provide information (e.g., authorizations, balances, transaction tokens, security information, account information, and/or the like) associated with processing a transaction via transaction terminal 240.

Transaction backend 250 may include one or more devices associated with financial institutions (e.g., banks, credit unions, and/or the like) and/or transaction card associations that authorize the transaction and/or facilitate a transfer of funds or payments between an account of a cardholder of projectable transaction card 210 and an account of an individual or business of transaction terminal 240. For example, transaction backend 250 may include one or more devices of one or more issuing financial institutions associated with a cardholder of projectable transaction card 210, one or more devices of one or more acquiring financial institutions (or merchant banks) associated with transaction terminal 240, and/or one or more devices associated with one or more card associations (e.g., VISA®, MASTER-CARD®, and/or the like) associated with projectable transaction card 210. Accordingly, in response to receiving transaction card data associated with projectable transaction card 210 from transaction terminal 240, various financial institutions and/or card associations of transaction backend 250 may communicate to authorize the transaction and/or transfer funds between the accounts associated with projectable transaction card 210 and/or transaction terminal 240.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
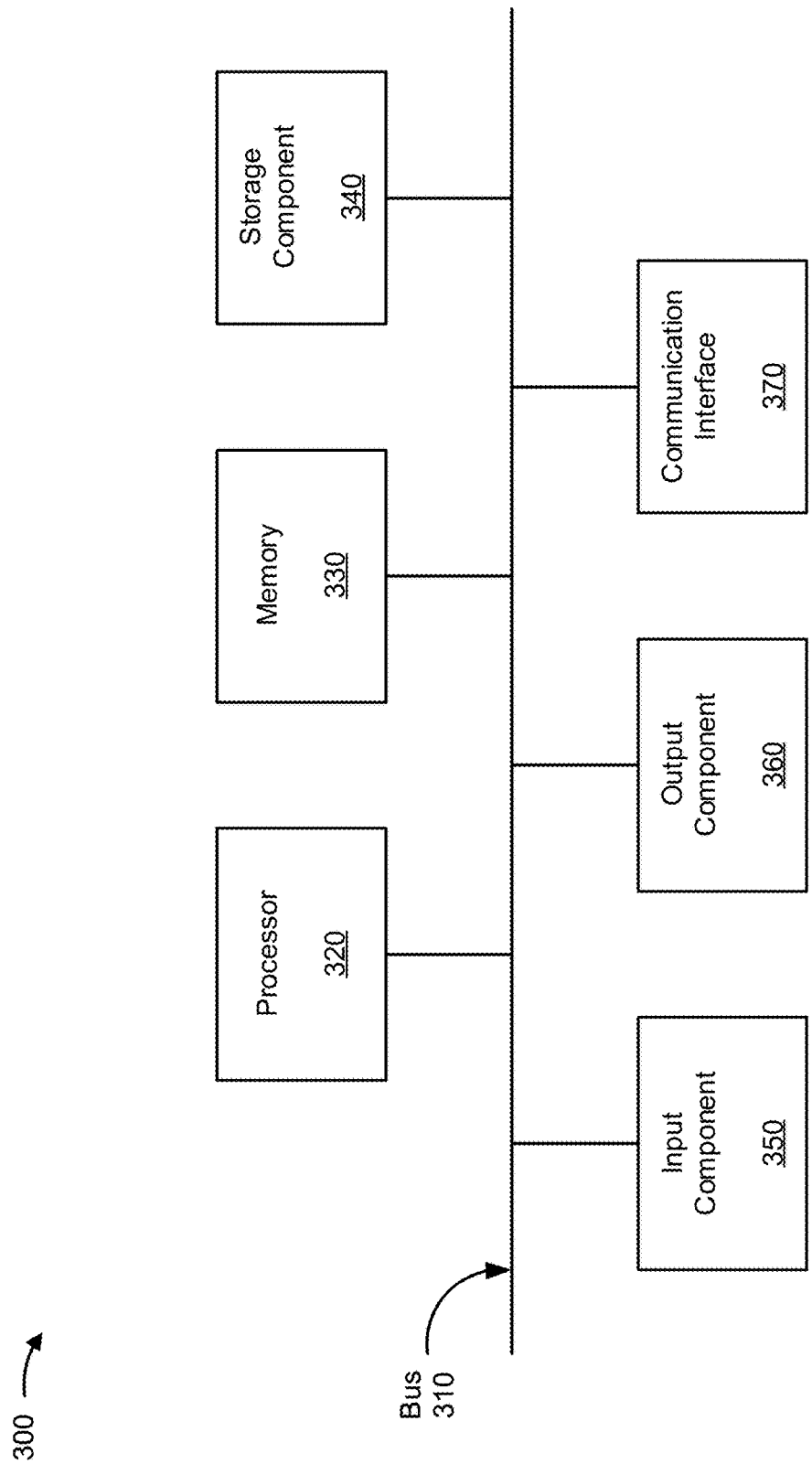
FIG. 3 is a diagram of example components of one or more devices of FIG. 2.

FIG. 3 is a diagram of example components of a device 300. Device 300 may correspond to projectable transaction card 210, transaction device 220, user device 230, transaction terminal 240, and/or transaction backend 250. In some implementations, projectable transaction card 210, transaction device 220, user device 230, transaction terminal 240, and/or transaction backend 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
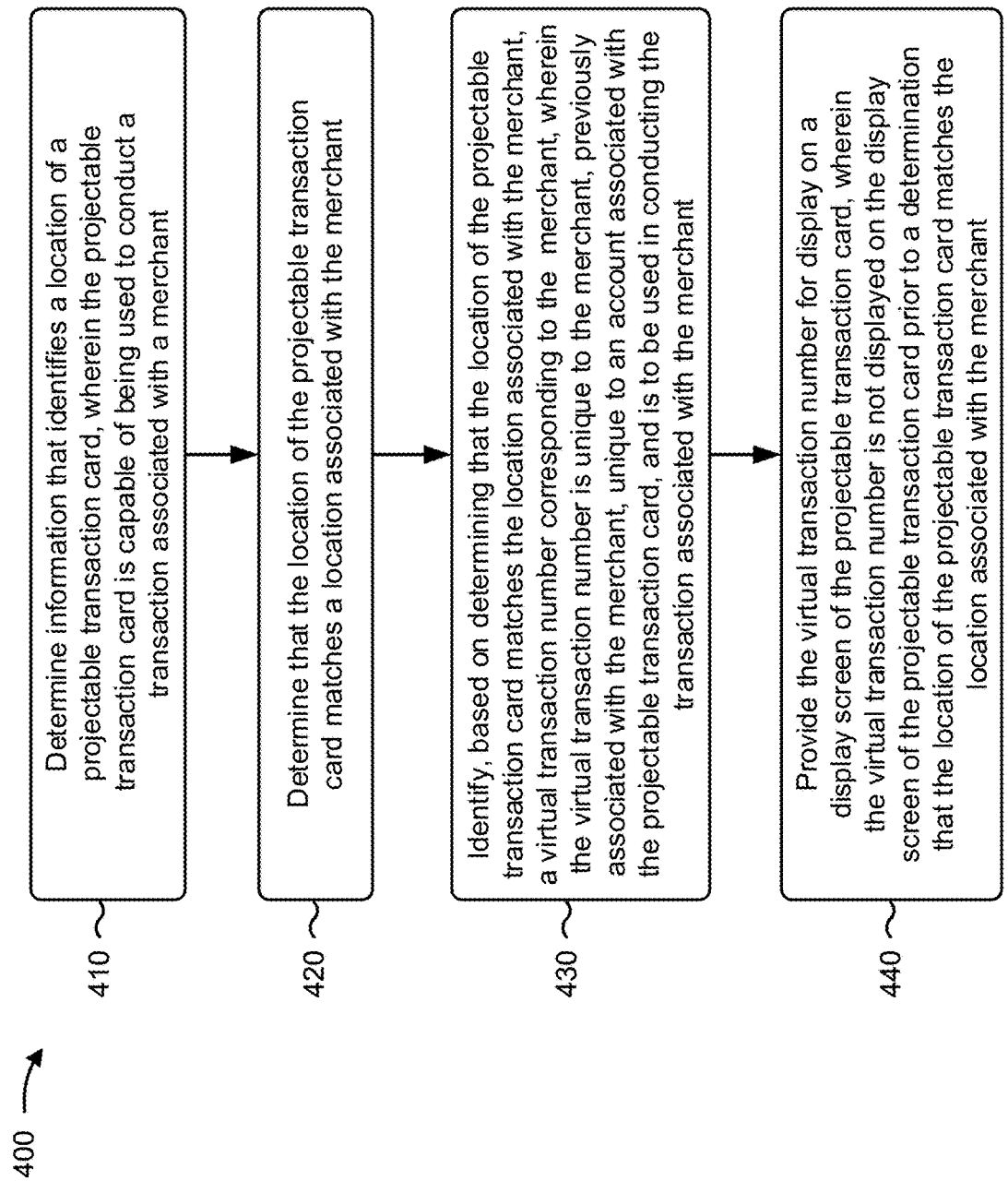

FIG. 4 is a flow chart of an example process 400 associated with merchant location based display for a projectable transaction card. In some implementations, one or more process blocks of FIG. 4 may be performed by a transaction device (e.g., transaction device 220 configured at least partially on projectable transaction card 210, user device 230, transaction terminal 240, and/or transaction backend 250).

As shown in FIG. 4, process 400 may include determining information that identifies a location of a projectable transaction card, wherein the projectable transaction card is capable of being used to conduct a transaction associated with a merchant (block 410). For example, the transaction device (e.g., using processor 320, memory 330, storage component 340, input component 350, output component 360, communication interface 370 and/or the like) may determine information that identifies a location of a projectable transaction card (e.g., projectable transaction card 210), as described above. In some implementations, the projectable transaction card is capable of being used to conduct a transaction associated with a merchant, as described above.

As further shown in FIG. 4, process 400 may include determining that the location of a projectable transaction card matches a location associated with the merchant (block 420). For example, the transaction device (e.g., using processor 320, memory 330, storage component 340, input component 350, output component 360, communication interface 370 and/or the like) may determine that the location of the projectable transaction card matches a location associated with the merchant, as described above.

As further shown in FIG. 4, process 400 may include identifying, based on determining that the location of the projectable transaction card matches the location associated with the merchant, a virtual transaction number wherein the virtual transaction number is unique to the merchant, previously associated with the merchant, unique to an account associated with the projectable transaction card, and is to be used in conducting the transaction associated with the merchant (block 430). For example, the transaction device (e.g., using processor 320, memory 330, storage component 340, input component 350, output component 360, communication interface 370 and/or the like) may identify, based on determining that the location of the projectable transaction card matches the location associated with the merchant, a virtual transaction number, as described above. In some implementations, the virtual transaction number is unique to the merchant, previously associated with the merchant, unique to an account associated with the projectable transaction card, and is to be used in conducting the transaction associated with the merchant, as described above.

As further shown in FIG. 4, process 400 may include providing the virtual transaction number for display on a display screen of the projectable transaction card, wherein the virtual transaction number is not displayed on the display screen of the projectable transaction card prior to a determination that the location of the projectable transaction card matches the location associated with the merchant (block 440). For example, the transaction device (e.g., using processor 320, memory 330, storage component 340, input component 350, output component 360, communication interface 370 and/or the like) may provide the virtual transaction number for display on a display screen of the projectable transaction card, as described above. In some implementations, the virtual transaction number is not displayed on the display screen of the projectable transaction card prior to a determination that the location of the projectable transaction card matches the location associated with the merchant, as described above.

Process 400 may include additional implementations, such as any single implementation or any combination of implementations described below and/or in connection with one or more other processes described elsewhere herein.

In a first implementation, the transaction device may determine that the location of the projectable transaction card is within a threshold distance of the location associated with the merchant. Here, when determining that the location of the projectable transaction card matches the location associated with the merchant, the transaction device may determine that the location of the projectable transaction card matches the location associated with the merchant based on determining that the location of the projectable transaction card is within the threshold distance of the location associated with the merchant.

In a second implementation, alone or in combination with the first implementation, the transaction device may determine that the location of the projectable transaction card is within a geographical area associated with the merchant. Here, when determining that the location of the projectable transaction card matches the location associated with the merchant, the transaction device may determine that the location of the projectable transaction card matches the location associated with the merchant based on determining that the location of the projectable transaction card is within the geographical area associated with the merchant.

In a third implementation, alone or in combination with any one or more of the first and second implementations, the transaction device may receive an indication that the projectable transaction card is at or near a transaction terminal and determine that the transaction terminal is associated with the merchant. Here, when determining that the location of the projectable transaction card matches the location associated with the merchant, the transaction device may determine that the location of the projectable transaction card matches the location associated with the merchant based on determining that the transaction terminal is associated with the merchant.

In a fourth implementation, alone or in combination with any one or more of the first through third implementations, the transaction device may receive an indication that the projectable transaction card is at or near a beacon device, and determine that the beacon device is associated with the merchant. Here, when determining that the location of the projectable transaction card matches the location associated with the merchant, the transaction device may determine that the location of the projectable transaction card matches the location associated with the merchant based on determining that the beacon device is associated with the merchant.

In a fifth implementation, alone or in combination with any one or more of the first through fourth implementations, the transaction device may provide, for display, a user interface associated with whether to use the virtual transaction number, and receive, based on user input provided via the user interface, an indication that the virtual transaction number is to be used at the location associated with the merchant. Here, when providing the virtual transaction number for display on the display screen of the projectable transaction card, the transaction device may provide the virtual transaction number for display based on the indication that the virtual transaction number is to be used at the location associated with the merchant.

In a sixth implementation, alone or in combination with any one or more of the first through fifth implementations, the transaction device may identify a number of transactions, associated with the virtual transaction number, corresponding to the location associated with the merchant, and determine that the number of transactions satisfies a transaction threshold. Here, when providing the virtual transaction number for display on the display screen of the projectable transaction card, the transaction device may provide the virtual transaction number for display based on determining that the number of transactions satisfies the transaction threshold.

In a seventh implementation, alone or in combination with any one or more of the first through sixth implementations, the transaction device may cause the virtual transaction number to be generated based at least in part on determining that the location of the projectable transaction card matches the location associated with the merchant. Here, when identifying the virtual transaction number corresponding to the merchant, the transaction device may identify the virtual transaction number based on causing the virtual transaction number to be generated.

In an eighth implementation, alone or in combination with any one or more of the first through seventh implementations, the location associated with the merchant is one of a plurality of locations associated with the merchant.

In a ninth implementation, alone or in combination with any one or more of the first through eighth implementations, the virtual transaction number is one of a plurality of virtual transaction numbers, each corresponding to one of a plurality of merchants.

In a tenth implementation, alone or in combination with any one or more of the first through ninth implementations, the transaction device may determine information that identifies an updated location of the projectable transaction card, determine that the updated location of the projectable transaction card does not match the location associated with the merchant, and cause the virtual transaction number to stop being displayed on the display screen of the projectable transaction card based on determining that the updated location of the projectable transaction card does not match the location associated with the merchant.

In an eleventh implementation, alone or in combination with any one or more of the first through tenth implementations, the transaction device may determine that the transaction associated with the merchant has been completed; and cause the virtual transaction number to stop being displayed on the display screen of the projectable transaction card based on determining that the transaction, associated with the merchant, has been completed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
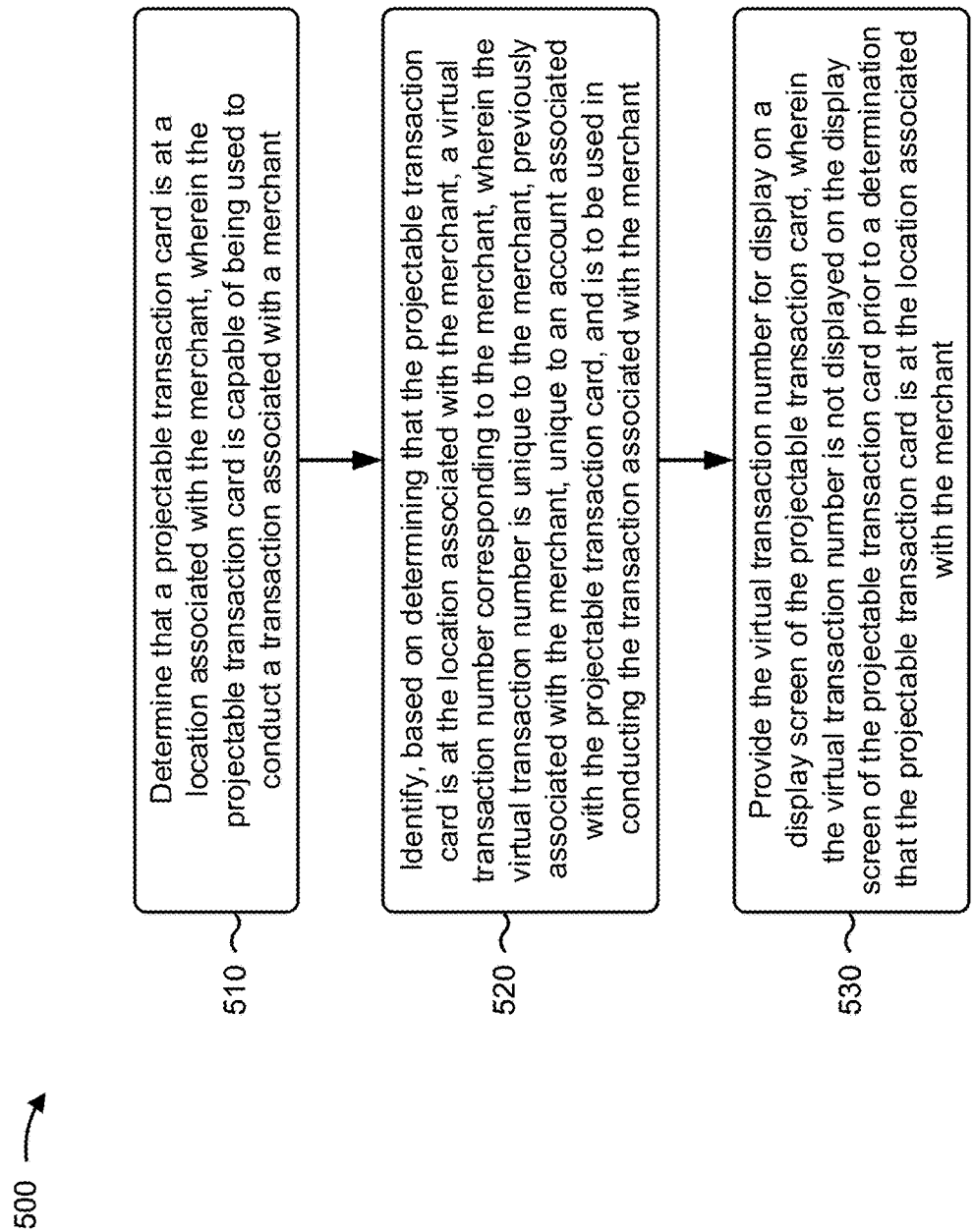

FIG. 5 is a flow chart of an example process 500 associated with merchant location based display for a projectable transaction card. In some implementations, one or more process blocks of FIG. 5 may be performed by a transaction device (e.g., transaction device 220 configured at least partially on projectable transaction card 210, user device 230, transaction terminal 240, and/or transaction backend 250).

As shown in FIG. 5, process 500 may include determining that a projectable transaction card is at a location associated with a merchant, wherein the projectable transaction card is capable of being used to conduct a transaction associated with the merchant (block 510). For example, the transaction device (e.g., using processor 320, memory 330, storage component 340, input component 350, output component 360, communication interface 370 and/or the like) may determine that a projectable transaction card (e.g., projectable transaction card 210) is at a location associated with a merchant, as described above. In some implementations, the projectable transaction card is capable of being used to conduct a transaction associated with the merchant, as described above.

As further shown in FIG. 5, process 500 may include identifying, based on determining that the projectable transaction card is at the location associated with the merchant, a virtual transaction number corresponding to the merchant, wherein the virtual transaction number is unique to the merchant, previously associated with the merchant, unique to an account associated with the projectable transaction card, and is to be used in conducting the transaction associated with the merchant (block 520). For example, the transaction device (e.g., using processor 320, memory 330, storage component 340, input component 350, output component 360, communication interface 370 and/or the like) may identify, based on determining that the projectable transaction card is at the location associated with the merchant, a virtual transaction number corresponding to the merchant, as described above. In some implementations, the virtual transaction number is unique to the merchant, previously associated with the merchant, unique to an account associated with the projectable transaction card, and is to be used in conducting the transaction associated with the merchant, as described above.

As further shown in FIG. 5, process 500 may include providing the virtual transaction number for display on a display screen of the projectable transaction card, wherein the virtual transaction number is not displayed on the display screen of the projectable transaction card prior to a determination that the projectable transaction card is at the location associated with the merchant (block 530). For example, the transaction device (e.g., using processor 320, memory 330, storage component 340, input component 350, output component 360, communication interface 370 and/or the like) may provide the virtual transaction number for display on a display screen of the projectable transaction card, as described above. In some implementations, the virtual transaction number is not displayed on the display screen of the projectable transaction card prior to a determination that the location of the projectable transaction card is at the location associated with the merchant, as described above.

Process 500 may include additional implementations, such as any single implementation or any combination of implementations described below and/or in connection with one or more other processes described elsewhere herein.

In a first implementation, the transaction backend may determine that a distance from a location of the projectable transaction card to the location associated with the merchant satisfies a threshold. Here, when determining that the projectable transaction card is at the location associated with the merchant, the transaction backend may determine that the projectable transaction card is at the location associated with the merchant based on determining that the distance from the location of the projectable transaction card to the location associated with the merchant satisfies the threshold.

In a second implementation, alone or in combination with the first implementation, the transaction backend may determine that the projectable transaction card is located within a geographical area associated with the merchant. Here, when determining that the projectable transaction card is at the location associated with the merchant, the transaction backend may determine that the projectable transaction card is at the location associated with the merchant based on determining that the projectable transaction card is located within the geographical area associated with the merchant.

In a third implementation, alone or in combination with any one or more of the first and second implementations, the transaction backend may receive an indication that the projectable transaction card is at or near a transaction terminal associated with the merchant. Here, when determining that the projectable transaction card is at the location associated with the merchant, the transaction backend may determine that the projectable transaction card is at the location associated with the merchant based on receiving the indication.

In a fourth implementation, alone or in combination with any one or more of the first through third implementations, the transaction backend may receive, based on user input provided via the projectable transaction card, an indication that the virtual transaction number is to be used at the location associated with the merchant. Here, when providing the virtual transaction number for display on the display screen of the projectable transaction card, the transaction backend may provide the virtual transaction number for display based on the indication that the virtual transaction number is to be used at the location associated with the merchant.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 associated with merchant location based display for a projectable transaction card. In some implementations, one or more process blocks of FIG. 6 may be performed by a transaction device (e.g., transaction device 220 configured at least partially on projectable transaction card 210, user device 230, transaction terminal 240, and/or transaction backend 250). In some implementations, one or more process blocks of FIG. 6 may be at least partially performed by another device or a group of devices separate from or including the transaction device, such as a projectable transaction card (e.g., projectable transaction card 210), a transaction terminal (e.g., transaction terminal 240), a user device (e.g., user device 230), and/or the like.

As shown in FIG. 6, process 600 may include identifying a location of a projectable transaction card, wherein the projectable transaction card is capable of being used to conduct a transaction associated with a merchant (block 610). For example, the transaction device (e.g., using processor 320, memory 330, storage component 340, input component 350, output component 360, communication interface 370 and/or the like) may identify a location of a projectable transaction card (e.g., projectable transaction card 210), as described above. In some implementations, the projectable transaction card is capable of being used to conduct a transaction associated with a merchant, as described above.

As further shown in FIG. 6, process 600 may include determining, based on the location of the projectable transaction card, that the location of the projectable transaction card matches a location associated with the merchant (block 620). For example, the transaction device (e.g., using processor 320, memory 330, storage component 340, input component 350, output component 360, communication interface 370 and/or the like) may determine, based on the location of the projectable transaction card, that the location of the projectable transaction card matches a location associated with the merchant, as described above.

As further shown in FIG. 6, process 600 may include identifying, based on determining that the location of the projectable transaction card matches the location associated with the merchant, a virtual transaction number corresponding to the merchant, wherein the virtual transaction number is unique to the merchant, previously associated with the merchant, unique to an account associated with the projectable transaction card, and is to be used in conducting the transaction associated with the merchant (block 630). For example, the transaction device (e.g., using processor 320, memory 330, storage component 340, input component 350, output component 360, communication interface 370 and/or the like) may identify, based on determining that the location of the projectable transaction card matches the location associated with the merchant, a virtual transaction number corresponding to the merchant, as described above. In some implementations, the virtual transaction number is unique to the merchant, previously associated with the merchant, unique to an account associated with the projectable transaction card, and is to be used in conducting the transaction associated with the merchant, as described above.

As further shown in FIG. 6, process 600 may include causing the virtual transaction number to be displayed on a display screen of the projectable transaction card, wherein the virtual transaction number is not displayed on the display screen of the projectable transaction card prior to a determination that the location of the projectable transaction card matches the location associated with the merchant (block 640). For example, the transaction device (e.g., using processor 320, memory 330, storage component 340, input component 350, output component 360, communication interface 370 and/or the like) may cause the virtual transaction number to be displayed on a display screen of the projectable transaction card, as described above. In some implementations, the virtual transaction number is not displayed on the display screen of the projectable transaction card prior to a determination that the location of the projectable transaction card matches the location associated with the merchant, as described above.

Process 600 may include additional implementations, such as any single implementation or any combination of implementations described below and/or in connection with one or more other processes described elsewhere herein.

In a first implementation, the transaction device may determine that the location of the projectable transaction card is within one of: a threshold distance of the location associated with the merchant, or an area corresponding to the location associated with the merchant. Here, when determining that the location of the projectable transaction card matches the location associated with the merchant, the transaction device may determine that the location of the projectable transaction card matches the location associated with the merchant based on determining that the location of the projectable transaction card is within one of the threshold distance or the area.

In a second implementation, alone or in combination with the first implementation, the transaction device may receive information indicating that the projectable transaction card is at or near a transaction terminal associated with the merchant. Here, when determining that the location of the projectable transaction card matches the location associated with the merchant, the transaction device may determine that the location of the projectable transaction card matches the location associated with the merchant based on receiving the indication.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a transaction device and from a user device, information that identifies a current location of a projectable transaction card, separate from the transaction device, that is in communication with the user device,
      wherein the projectable transaction card comprises a physical transaction card with an integrated circuit (IC) chip, and
      wherein the projectable transaction card is capable of being used to conduct a transaction associated with a merchant;
   determining, by the transaction device, that the current location of the projectable transaction card matches a location associated with the merchant;
   identifying, by the transaction device and based on determining that the current location of the projectable transaction card matches the location associated with the merchant, a virtual transaction number from a plurality of virtual transaction numbers associated with the projectable transaction card,
      wherein the virtual transaction number is:
         unique to the merchant,
         previously associated with the merchant,
         unique to an account associated with the projectable transaction card, and
         is to be used in conducting the transaction associated with the merchant, and
      wherein each of the plurality of virtual transaction numbers is associated with a single account identifier that corresponds to the account associated with the projectable transaction card;
   providing, by the transaction device, via the user device, and to the projectable transaction card, the virtual transaction number for display on a display screen of the projectable transaction card,
      wherein the virtual transaction number is provided to the projectable transaction card via a wireless communication between the projectable transaction card and the user device, and
      wherein the virtual transaction number is not displayed on the display screen of the projectable transaction card prior to a determination that the current location of the projectable transaction card matches the location associated with the merchant;
   transmitting, by the transaction device, via the user device, and to the projectable transaction card, an instruction that causes the projectable transaction card to store the virtual transaction number on a cache associated with the IC chip of the projectable transaction card;
   determining, by the transaction device, that the transaction associated with the merchant has been completed; and stopping, by the transaction device, the virtual transaction number from being displayed on the display screen of the projectable transaction card based on determining that the transaction, associated with the merchant, has been completed.

2. The method of claim 1, further comprising:
determining that the current location of the projectable transaction card is within a threshold distance of the location associated with the merchant; and
wherein determining that the current location of the projectable transaction card matches the location associated with the merchant comprises:
determining that the current location of the projectable transaction card matches the location associated with the merchant based on determining that the current location of the projectable transaction card is within the threshold distance of the location associated with the merchant.

3. The method of claim 1, further comprising:
determining that the current location of the projectable transaction card is within a geographical area associated with the merchant; and
wherein determining that the current location of the projectable transaction card matches the location associated with the merchant comprises:
determining that the current location of the projectable transaction card matches the location associated with the merchant based on determining that the current location of the projectable transaction card is within the geographical area associated with the merchant.

4. The method of claim 1, further comprising:
receiving an indication that the projectable transaction card is currently at or near a transaction terminal;
determining that the transaction terminal is associated with the merchant; and
wherein determining that the current location of the projectable transaction card matches the location associated with the merchant comprises:
determining that the current location of the projectable transaction card matches the location associated with the merchant based on determining that the transaction terminal is associated with the merchant.

5. The method of claim 1, further comprising:
receiving an indication that the projectable transaction card is currently at or near a beacon device;
determining that the beacon device is associated with the merchant; and
wherein determining that the current location of the projectable transaction card matches the location associated with the merchant comprises:
determining that the current location of the projectable transaction card matches the location associated with the merchant based on determining that the beacon device is associated with the merchant.

6. The method of claim 1, further comprising:
receiving, based on user input provided via a user interface, an indication that the virtual transaction number is to be used at the location associated with the merchant; and
wherein providing the virtual transaction number for display on the display screen of the projectable transaction card comprises:
providing the virtual transaction number for display based on the indication that the virtual transaction number is to be used at the location associated with the merchant.

7. The method of claim 1, further comprising:
identifying a number of transactions, associated with the virtual transaction number, corresponding to the location associated with the merchant;
determining that the number of transactions satisfies a transaction threshold; and
wherein providing the virtual transaction number for display on the display screen of the projectable transaction card comprises:
providing the virtual transaction number for display based on determining that the number of transactions satisfies the transaction threshold.

8. The method of claim 1, further comprising:
generating, by the transaction device, the virtual transaction number, or
causing, by at least one of the user device associated with the projectable transaction card or the projectable transaction card, the virtual transaction number to be generated based at least in part on determining that the current location of the projectable transaction card matches the location associated with the merchant; and
wherein identifying the virtual transaction number corresponding to the merchant comprises:
identifying the virtual transaction number based on the generation of the virtual transaction number.

9. The method of claim 1, wherein the location associated with the merchant is one of a plurality of locations associated with the merchant.

10. The method of claim 1, wherein the virtual transaction number is one of a plurality of virtual transaction numbers, each corresponding to one of a plurality of merchants.

11. The method of claim 1, further comprising:
determining information that identifies an updated current location of the projectable transaction card,
determining that the updated current location of the projectable transaction card does not match the location associated with the merchant, and
causing the virtual transaction number to stop being displayed on the display screen of the projectable transaction card based on determining that the updated current location of the projectable transaction card does not match the location associated with the merchant.

12. A transaction device, comprising:
one or more memories; and
one or more processors communicatively coupled to the one or more memories, configured to:
receive, from a user device, information that indicates that a projectable transaction card, that is in communication with the user device and separate from the transaction device, is currently at a location associated with a merchant,
wherein the projectable transaction card comprises a physical transaction card with an integrated circuit (IC) chip, and
wherein the projectable transaction card is capable of being used to conduct a transaction associated with the merchant;
identify, based on determining that the projectable transaction card is currently at the location associated with the merchant, a virtual transaction number, from a plurality of virtual transaction numbers associated with the projectable transaction card, corresponding to the merchant,
wherein the virtual transaction number is:
unique to the merchant,
previously associated with the merchant,
unique to an account associated with the projectable transaction card, and is to be used in conducting the transaction associated with the merchant, and wherein each of the plurality of virtual transaction numbers is associated with a single account identifier that corresponds to the account associated with the projectable transaction card;

provide, via the user device and to the projectable transaction card, the virtual transaction number for display on a display screen of the projectable transaction card, wherein the virtual transaction number is provided to the projectable transaction card via a wireless communication between the projectable transaction card and the user device, and wherein the virtual transaction number is not displayed on the display screen of the projectable transaction card prior to a determination that the projectable transaction card is currently at the location associated with the merchant;

transmit, to the projectable transaction card and via the user device, an instruction that causes the projectable transaction card to store the virtual transaction number on a cache associated with the IC chip of the projectable transaction card;

determine that the transaction associated with the merchant has been completed; and cause the virtual transaction number to stop being displayed on the display screen of the projectable transaction card based on determining that the transaction, associated with the merchant, has been completed.

13. The transaction device of claim 12, wherein the one or more processors are further configured to:
determine that a distance from a current location of the projectable transaction card to the location associated with the merchant satisfies a threshold; and
wherein the one or more processors, when determining that the projectable transaction card is currently at the location associated with the merchant, are configured to:
determine that the projectable transaction card is currently at the location associated with the merchant based on determining that the distance from the current location of the projectable transaction card to the location associated with the merchant satisfies the threshold.

14. The transaction device of claim 12, wherein the one or more processors are further configured to:
determine that the projectable transaction card is currently located within a geographical area associated with the merchant; and
wherein the one or more processors, when determining that the projectable transaction card is currently at the location associated with the merchant, are configured to:
determine that the projectable transaction card is currently at the location associated with the merchant based on determining that the projectable transaction card is currently located within the geographical area associated with the merchant.

15. The transaction device of claim 12, wherein the one or more processors are further configured to:
receive an indication that the projectable transaction card is currently at or near a transaction terminal associated with the merchant; and wherein the one or more processors, when determining that the projectable transaction card is currently at the location associated with the merchant, are configured to:
determine that the projectable transaction card is currently at the location associated with the merchant based on receiving the indication.

16. The transaction device of claim 12, wherein the one or more processors are further configured to:
receive, based on user input provided via the projectable transaction card, an indication that the virtual transaction number is to be used at the location associated with the merchant; and
wherein the one or more processors, when providing the virtual transaction number for display on the display screen of the projectable transaction card, are configured to:
provide the virtual transaction number for display based on the indication that the virtual transaction number is to be used at the location associated with the merchant.

17. A non-transitory computer-readable medium storing instructions, the instructions comprising:
one or more instructions that, when executed by one or more processors of a transaction device, cause the one or more processors to:
identify, based on location information received from a user device, a current location of a projectable transaction card that is in communication with the user device and separate from the transaction device,
wherein the projectable transaction card comprises a physical transaction card with an integrated circuit (IC) chip, and
wherein the projectable transaction card is capable of being used to conduct a transaction associated with a merchant;
determine, based on the current location of the projectable transaction card, that the current location of the projectable transaction card matches a location associated with the merchant;
identify, based on determining that the current location of the projectable transaction card matches the location associated with the merchant, a virtual transaction number, from a plurality of virtual transaction numbers associated with the projectable transaction card corresponding to the merchant,
wherein the virtual transaction number is:
unique to the merchant,
previously associated with the merchant,
unique to an account associated with the projectable transaction card, and
is to be used in conducting the transaction associated with the merchant, and
wherein each of the plurality of virtual transaction numbers is associated with a single account identifier that corresponds to the account associated with the projectable transaction card;
provide, to the projectable transaction card and via a wireless communication with the user device, data that causes the virtual transaction number to be displayed on a display screen of the projectable transaction card,
wherein the virtual transaction number is not displayed on the display screen of the projectable transaction card prior to a determination that the current location of the projectable transaction card matches the location associated with the merchant;

transmit, to the projectable transaction card and via the user device, an instruction that causes the projectable transaction card to store the virtual transaction number on a cache associated with the IC chip of the projectable transaction card;

determine that the transaction associated with the merchant has been completed; and stop the virtual transaction number from being displayed on the display screen of the projectable transaction card based on determining that the transaction, associated with the merchant, has been completed.

18. The non-transitory computer-readable medium of claim 17, wherein the one or more instructions, when executed by the one or more processors, further cause the one or more processors to:

determine that the current location of the projectable transaction card is within one of:
  a threshold distance of the location associated with the merchant, or
  an area corresponding to the location associated with the merchant; and wherein the one or more instructions, that cause the one or more processors to determine that the current location of the projectable transaction card matches the location associated with the merchant, cause the one or more processors to:

determine that the current location of the projectable transaction card matches the location associated with the merchant based on determining that the current location of the projectable transaction card is within one of the threshold distance or the area.

19. The non-transitory computer-readable medium of claim 17, wherein the one or more instructions, when executed by the one or more processors, further cause the one or more processors to:

receive information indicating that the projectable transaction card is currently at or near a transaction terminal associated with the merchant; and wherein the one or more instructions, that cause the one or more processors to determine that the current location of the projectable transaction card matches the location associated with the merchant, cause the one or more processors to:

determine that the current location of the projectable transaction card matches the location associated with the merchant based on receiving the indication.

20. The method of claim 1, wherein stopping the virtual transaction number from being displayed comprises:

transmitting, via the user device and to the projectable transaction card, another instruction that causes the projectable transaction card to stop displaying the virtual transaction number.

\* \* \* \* \*